US006992806B2

(12) United States Patent
Baba et al.

(10) Patent No.: US 6,992,806 B2
(45) Date of Patent: Jan. 31, 2006

(54) OPTICAL ELEMENT, OPTICAL DEFLECTION ELEMENT, OPTICAL MULTIPLEXING ELEMENT, AND SCANNING APPARATUS

(75) Inventors: Toshihiko Baba, Yamato (JP); Takeharu Tani, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 51 days.

(21) Appl. No.: 10/680,111

(22) Filed: Oct. 8, 2003

(65) Prior Publication Data

US 2005/0068597 A1 Mar. 31, 2005

Related U.S. Application Data

(62) Division of application No. 09/941,617, filed on Aug. 30, 2001, now Pat. No. 6,674,954.

(30) Foreign Application Priority Data

Sep. 1, 2000 (JP) .............................. 2000-265434

(51) Int. Cl.
$G02B\ 26/08$ (2006.01)
(52) U.S. Cl. .......................... 359/196; 359/321; 385/39
(58) Field of Classification Search ............... 359/298, 359/321, 322, 577, 196, 198; 385/27, 36
See application file for complete search history.

(56) References Cited

U.S. PATENT DOCUMENTS

| | | | |
|---|---|---|---|
| 6,134,369 A | 10/2000 | Kurosawa | |
| 6,381,389 B1 | 4/2002 | Kosaka | |
| 6,448,997 B1 | 9/2002 | Koide | |

FOREIGN PATENT DOCUMENTS

| | | |
|---|---|---|
| JP | 11-271541 | 10/1999 |
| JP | 2000-56146 | 2/2000 |
| JP | 2000-66002 | 3/2000 |
| JP | 2001-091701 | 4/2001 |

OTHER PUBLICATIONS

Kosaka, et al., "Superpris phenomena in photonic crystals", Oct. 15, 1999-II.

Primary Examiner—Euncha P. Cherry
(74) Attorney, Agent, or Firm—Sughrue Mion, PLLC

(57) ABSTRACT

In an optical element, a propagation direction of incident light beam is largely changed and the direction-changed light beam is derived in a desirable direction without increasing a dimension and manufacturing cost thereof. The optical element includes photonic crystal having a refractive index which changes periodically depending on a location of the photonic crystal, wherein an angle defined between a first end face and a second end face thereof is determined in such a manner that a light beam incident upon the first end face at a predetermined incidence angle and having a predetermined wavelength is emitted from the second end face in a desirable direction.

11 Claims, 15 Drawing Sheets

OPTICAL ELEMENT, OPTICAL DEFLECTION ELEMENT, OPTICAL MULTIPLEXING ELEMENT, AND SCANNING APPARATUS

This is a divisional of application Ser. No. 09/941,617 filed Aug. 30, 2001, now U.S. Pat. No. 6,674,954 the disclosure of which is incorporated herein by reference.

BACKGROUND OF THE INVENTION

1. Field of the Invention

The present invention is related to an optical element for emitting an incident light beam in a desirable direction, an optical deflection element for emitting a plurality of light beams having different incidence angles or different wavelengths from each other in different directions, and an optical multiplexing element for optically multiplexing a plurality of light beams having different incidence angles in the same direction. Further, the present invention is related to a scanning apparatus with employment of such an optical deflection element.

2. Description of a Related Art

Conventionally, as an optical element or an optical deflection element, passive elements such as a prism, a diffraction grating, a concave lens and soon have been utilized. Further, very recently, as an optical deflection element, active elements such as a diffraction grating using an acoust-optic effect and a galvano scanner have been employed.

In such a diffraction grating using the acoust-optic effect, by propagating a compression wave (for instance, an ultrasonic wave) through a medium such as glass, a refractive index is changed periodically, so that a light beam is emitted in different directions. In a galvano scanner, by vibrating a mirror by using a resonant head, a light beam is emitted in different directions.

However, since the passive elements such as the prism, the diffraction grating, and the concave lens have a small deflection angle at which a light beam is emitted from the passive element, a long optical path is necessarily required so as to separate the incident light beam into a plurality of light beams corresponding to incidence angles or wavelengths. Therefore, in order that the light beams having different incidence angles or different wavelengths are deflected in a wide range, a dimension of such a passive element itself must be increased, and also the entire optical apparatus must be made large so as to secure the long optical path. On the other hand, in the active elements such as the diffraction grating using the acoust-optic effect and the galvano scanner, although light can be deflected in a wide range, cost of the active element itself is expensive, and also the active element owns a slow response to the input signals.

Very recently, specific crystal (namely, photonic crystal) having a different optical characteristic from that of the conventional optical crystal has been effectively developed. The photonic crystal owns a crystal structure in which, within a first medium, a second medium having a different refractive index from that of the first medium is arranged at an interval corresponding to a wavelength of light. The photonic crystal owns a refractive index distribution which is changed periodically, and shows such a phenomenon (namely, superprism effect) in which refraction directions of light beams having slightly different incidence angles or wavelengths from each other are largely changed. The optical characteristics shown by the photonic crystal are described in detail, for example, in "Superprism phenomenon in photonic crystals" written by H. Kosaka et al., Physical Review B Vol. 58, No. 16, Oct. 15, 1998, and in Japanese Laid-open Patent Application JP-A-2000-66002.

Currently, various optical elements with employment of such photonic crystal as manufacturing materials thereof have been proposed. For example, Japanese Laid-open Patent Application JP-A-2000-56146 discloses such a self-waveguide circuit provided with photonic crystal on a major portion of a substrate so as to propagate a light beam within the substrate in the self-waveguide manner to separate the propagated light beam into a desirable number of light beams. Also, Japanese Laid-open Patent Application JP-A-11-271541 discloses such a wavelength separating circuit having the photonic crystal interposed between two claddings as materials so as to separate a light beam in correspondence with wavelengths of the components.

However, those conventional techniques disclosed in the above-mentioned documents are directed to the optical separating operations of the light beams. Therefore, those conventional optical elements/circuits cannot be utilized as, for instance, an optical deflection element for deflecting a plurality of light beams having different incidence angles or different wavelengths in different directions. As described above, no one could succeed in developing of optical elements, optical deflection elements, nor optical multiplexing elements which employ the photonic crystal as manufacturing materials thereof.

SUMMARY OF THE INVENTION

The present invention has been made to solve the above-explained problems. Therefore, a first object of the present invention is to provide an optical element for directing a light beam having a specific wavelength to a desirable direction by changing a propagation direction of the light beam in a wide range, without increasing an element size of the optical element, and furthermore, without increasing manufacturing cost thereof.

Also, a second object of the present invention is to provide an optical deflection element for deflecting light beams having different incidence angles or different wavelengths toward different emergence angles in a wide range, without increasing an element size of the optical deflection element, and furthermore, without increasing manufacturing cost thereof.

Furthermore, a third object of the present invention is to provide an optical multiplexing element for multiplexing light beams having different incidence angles with each other and emitting in the same direction, without increasing an element size of the optical multiplexing element, and furthermore, without increasing manufacturing cost thereof.

In addition, a fourth object of the present invention is to provide a scanning apparatus for scanning a light beam in a wide range at a high speed by causing a slight change in the incidence angle or wavelength, without increasing a size of the apparatus, and furthermore, without increasing manufacturing cost thereof.

To achieve the above-described objects, an optical element according to the present invention, comprises: photonic crystal having a refractive index which changes periodically depending on a location of the photonic crystal; wherein: an angle defined between a first end face and a second end face of the optical element is determined in such a manner that a light beam incident upon the first end face at a predetermined incidence angle and having a predetermined wavelength is emitted from the second end face in a desirable direction.

In the optical element, the photonic crystal may be provided between a first normal optical medium and a second normal optical medium.

Also, an optical deflection element according the present invention comprises: photonic crystal having a refractive index which changes periodically depending on a location of the photonic crystal; wherein: the optical deflecting element has a first end face and a second end face; and a shape of the second end face of the optical deflection element is determined in such a manner that a plurality of light beams incident upon the first end face at different incidence angles and having the same wavelength are emitted from the second end face in different directions corresponding to the incidence angles.

Alternatively, the shape of the second end face of the optical deflection element may be determined in such a manner that a plurality of light beams incident upon the first end face at the same incidence angle and having different wavelengths are emitted from the second end face in different directions corresponding to the wavelengths.

In the optical deflection element, the photonic crystal may be provided between a first normal optical medium and the second normal optical medium.

Also, an optical multiplexing element according to the present invention comprises: photonic crystal having a refractive index which changes periodically depending on a location of the photonic crystal; wherein: a shape of a first end face of the optical multiplexing element is determined in such a manner that a plurality of light beams incident upon the first end face of the optical multiplexing element at different incidence angles are optically multiplexed with each other along the same direction at a second end face of the optical multiplexing element.

In the optical multiplexing element, the photonic crystal may be provided between a first normal optical medium and a second normal optical medium.

Furthermore, a scanning apparatus according to a first aspect of the present invention comprises: an optical deflection element including photonic crystal having a refractive index which changes periodically depending on a location of the photonic crystal, the optical deflection element having a first end face and a second end face, a shape of the second surface of the optical deflection element being determined in such a manner that a plurality of light beams incident upon the first end face at different incidence angles and having the same wavelength are emitted from the second end face in different directions corresponding to the incidence angles; a light source for outputting a light beam having a constant wavelength toward the optical deflection element; and a resonant head for vibrating the optical deflection element, whereby a light beam deflected by the optical deflecting element is scanned with respect to an object.

On the other hand, a scanning apparatus according to a second aspect of the present invention comprises: an optical deflection element including photonic crystal having a refractive index which changes periodically depending on a location of the photonic crystal, the optical deflection element having a first end face and a second end face, a shape of the second surface of the optical deflection element is determined in such a manner that a plurality of light beams incident upon the first end face at the same incidence angle and having different wavelengths are emitted from the second end face in different directions corresponding to the wavelengths; and a light source for changing a wavelength of a light beam to be output toward the optical deflection element, whereby a light beam deflected by the optical deflecting element is scanned with respect to an object.

In the scanning apparatus, the photonic crystal may be provided between a first normal optical medium and a second normal optical medium.

DESCRIPTION OF THE PREFERRED EMBODIMENTS

Figure 1:
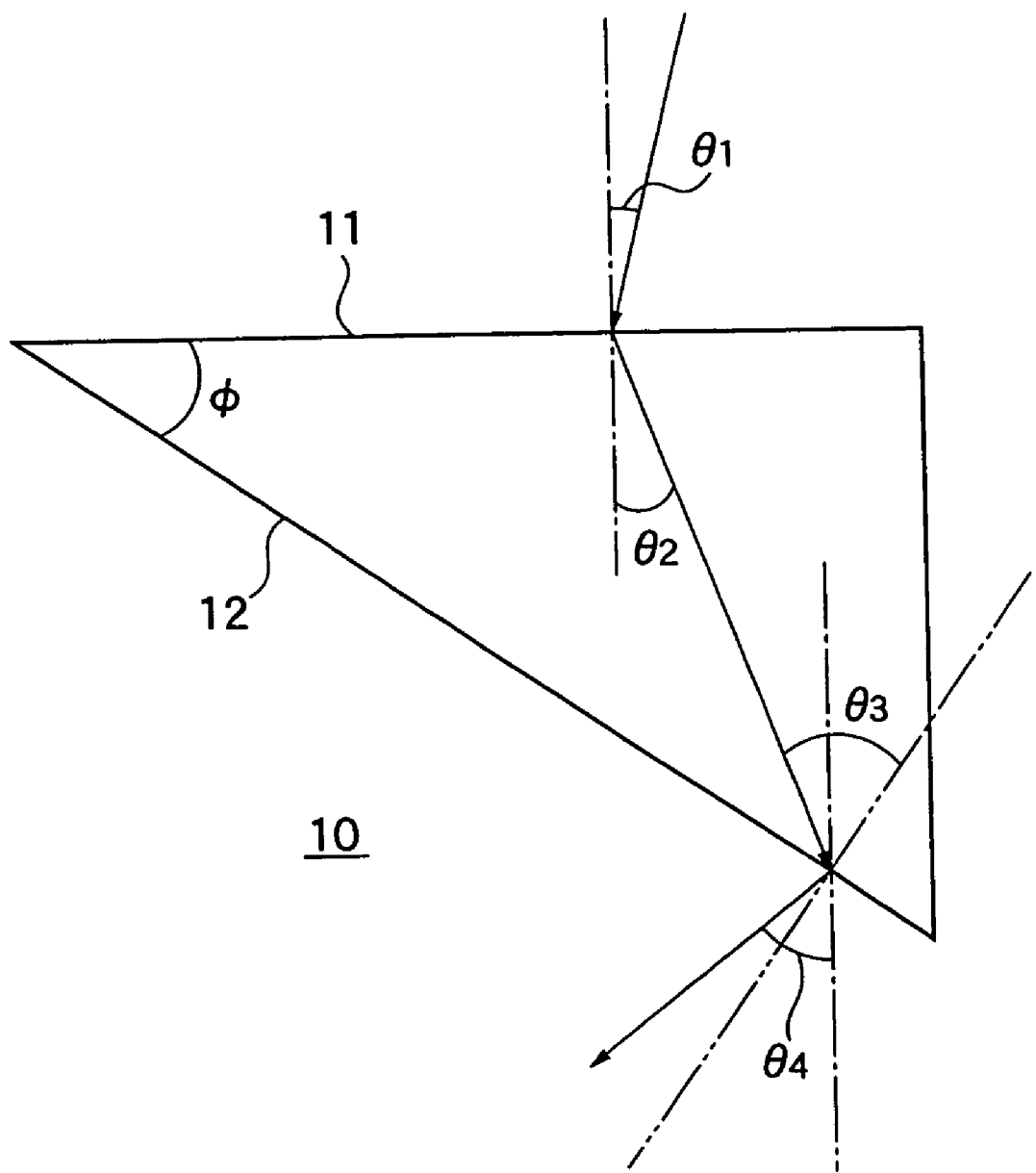
FIG. 1 is a plan view showing a shape of an optical element according to one embodiment of the present invention.

Referring now to drawings, various preferred embodiments of the present invention will be described in detail. It should be understood that the same reference numerals will be employed as those for indicating the same structural elements, and therefore, explanations thereof are omitted. It should also be noted that the below-mentioned various numeral values employed in the respective embodiments correspond to typical values for the sake of simplification, and the present invention may be applied to other values by considering the technical scope of the present invention.

FIG. 1 is a plan view showing a shape of an optical element according to one embodiment of the present invention. It should be understood that in the embodiment, an "emergence angle" is referred to as such an angle that is defined between an incident normal on the optical element 10 and a direction in which a light beam is emitted from the optical element 10.

The optical element 10 corresponds to a passive element which is used for emitting an incident light beam in a desirable direction. The optical element 10 employs photonic crystal as shown in FIG. 2 as material.

Figure 2:
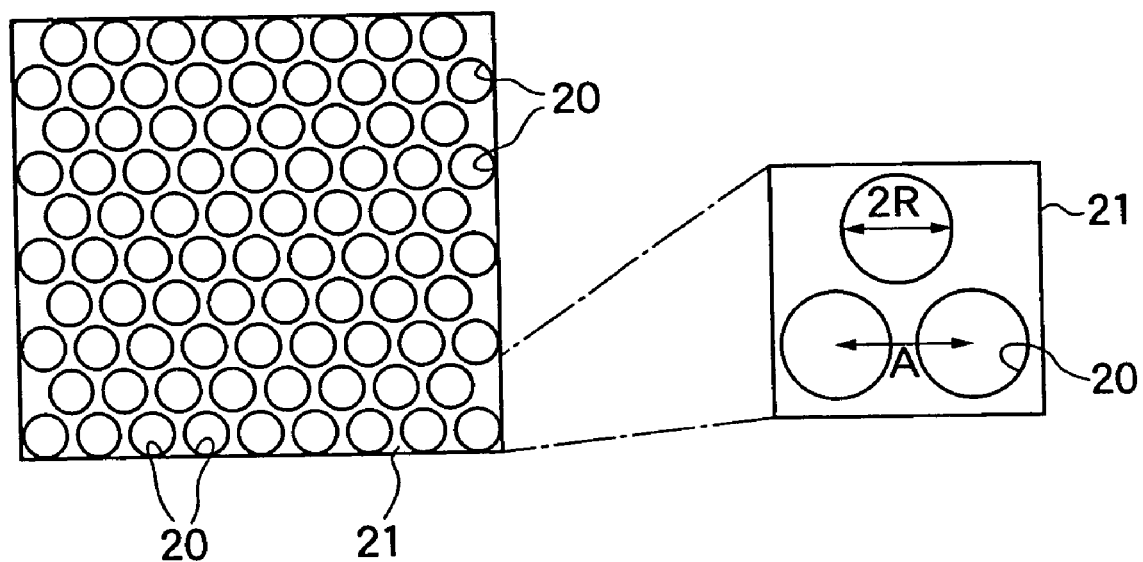
FIG. 2 is a diagram illustratively showing an example of photonic crystal employed as a material of the optical element as shown in FIG. 1.

The photonic crystal as shown in FIG. 2 is formed from such a structure. That is, a large number of circular holes 20 are formed in a silicon (Si) substrate 21 periodically (with predetermined intervals) by a two-dimensional triangular lattice arrangement. Those circular holes 20 are filled with air. Due to such a structure, a refractive index of the optical element 10 is changed periodically (cyclically or alternately) In the embodiment, while an effective refractive index of the silicon substrate is set to 3.065, a wavelength of an objective light beam which is propagated in a vacuum atmosphere is equal to, for example, 1.55 $\mu$m, a radius "R" of the circular hole is selected to be 0.387 $\mu$m, and also a pitch "A" of the circular holes is selected to be 0.93 $\mu$m.

The photonic crystal as shown in FIG. 2 is fabricated in such a manner that, for instance, after resist is formed on the silicon substrate except for potions where the circular holes are formed, the resultant substrate is treated by a dry etching process having a superior perpendicularity.

It should also be noted that any other media (for example, glass, dielectric material, and polymer) different than the above-described air may be filled into the circular holes 20, and also a medium having a refractive index which is larger than that of silicon may be filled into the circular holes 20. Alternatively, the arrangement of the medium employed in the photonic crystal is not limited to such a two-dimensional triangular lattice arrangement as shown in FIG. 2, but may be realized by a two-dimensional periodic arrangement such as a two-dimensional square-shaped lattice arrangement, a three-dimensional periodic arrangement, and so on. The alternative idea may be similarly applied to the below-mentioned various embodiments.

Figure 3:
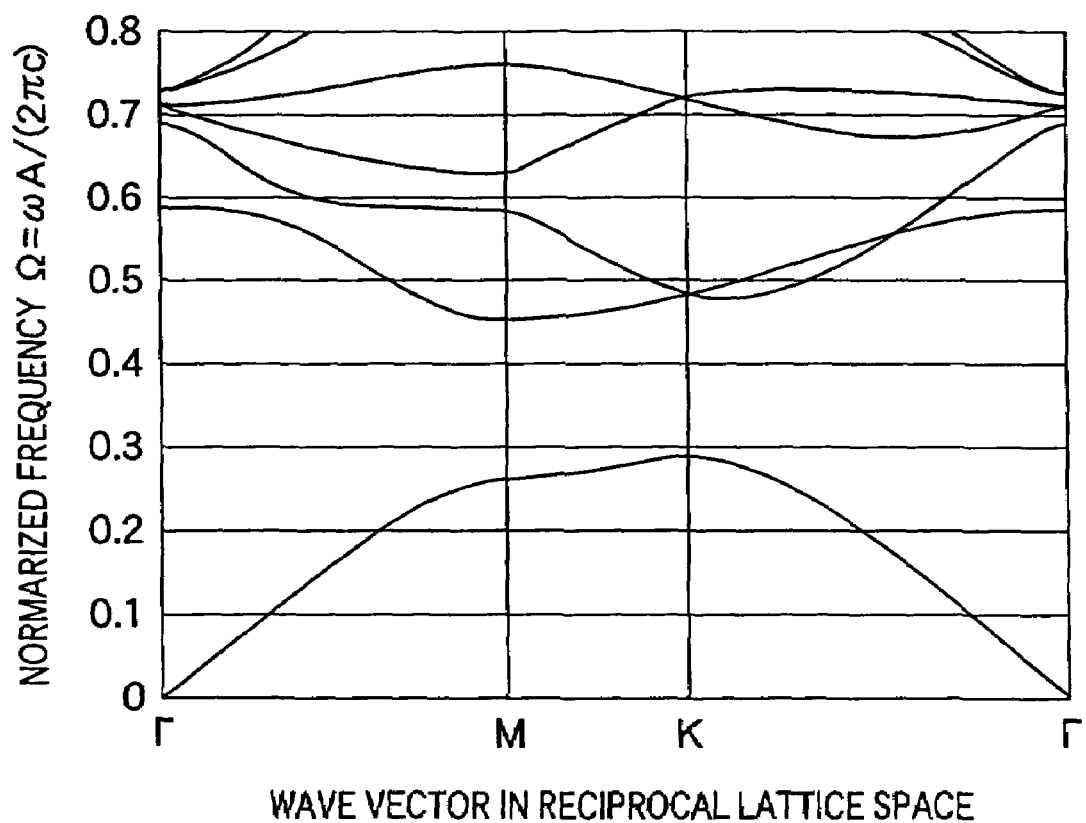
FIG. 3 represents a photonic band diagram in such a case where a light beam is propagated through the photonic crystal as shown in FIG. 2 in parallel to the plane of the drawing, which light beam has a plane of polarization parallel to the plane of the drawing.

Since a light beam propagated through photonic crystal is influenced by a multiple scattering phenomenon caused by the periodic structure of the photonic crystal, a propagation characteristic of the propagated light beam can be explained with reference to such a photonic band diagram which is similar to a band diagram of an electron in a semiconductor. For example, in the case where light is propagated through the photonic crystal as shown in FIG. 2 in parallel to the drawing plane, which light beam has a plane of polarization parallel to the drawing plane, such a photonic band diagram as shown in FIG. 3 is obtained. Such a photonic band diagram gives a relationship between a wave vector in a reciprocal lattice space and a normalized frequency $\Omega=\omega A/(2\pi c)$. It should be noted that "$\omega$" represents an angular frequency of light and "c" represents a light velocity in a vacuum atmosphere.

Figure 4:
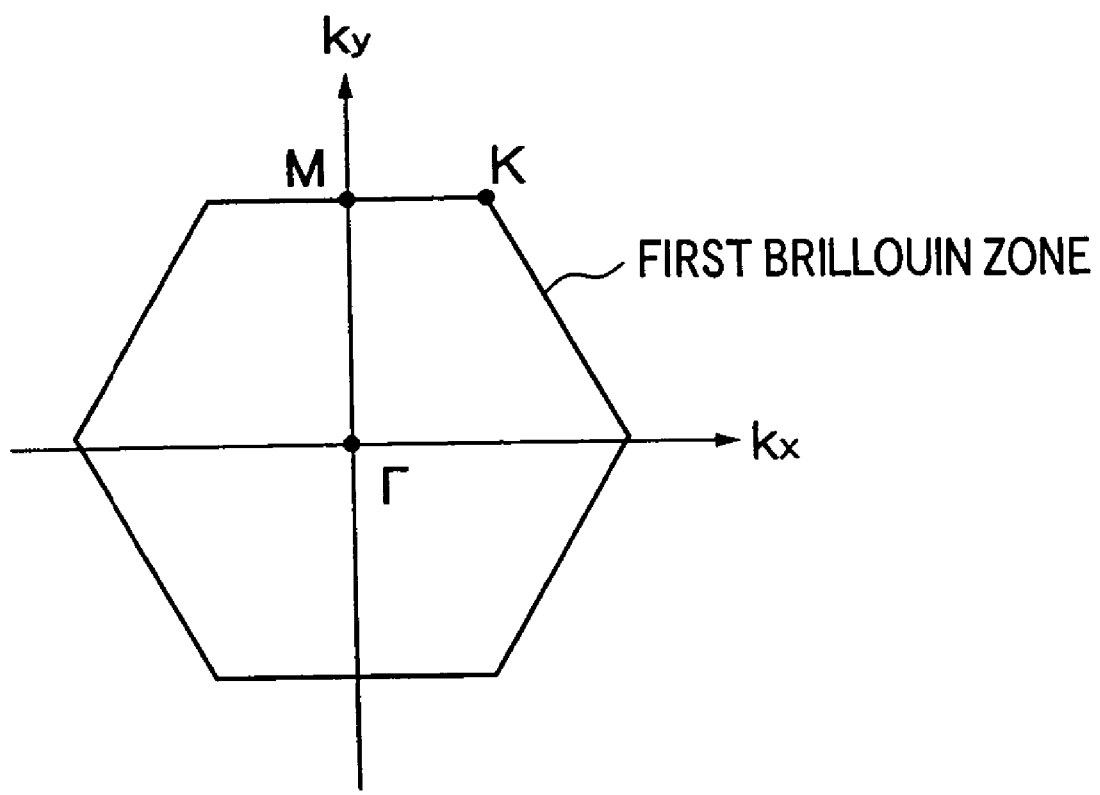
FIG. 4 is a diagram illustratively showing a first Brillouin zone of the photonic crystal as shown in FIG. 2 which is sliced at a specific normalized frequency.

In FIG. 3, there is shown a photonic band diagram formed by way of the reduced zone scheme. Also, it should be understood that symbols "$\Gamma$", "M", "K" given to an abscissa in FIG. 3 indicate specific wave vectors in a first Brillouin zone as shown in FIG. 4.

While considering such an example that a wavelength of light of interest is selected to be 1.55 $\mu$m (normalized frequency $\Omega=0.6$), a description will now be made of such a method of determining an angle "$\phi$" defined between a first end face 11 and a second end face 12 of the photonic crystal as shown in FIG. 1.

Figure 5:
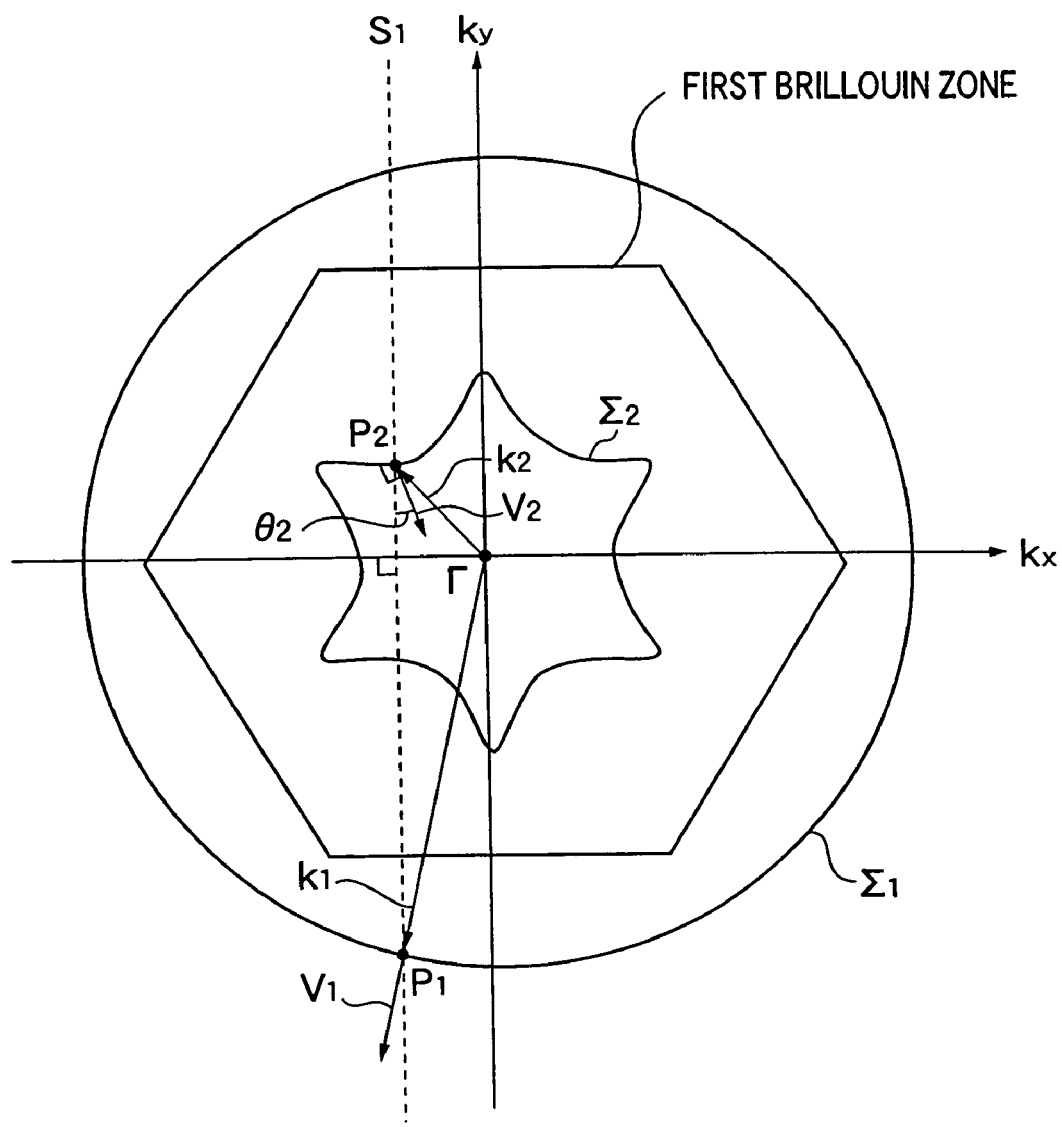
FIG. 5 is a diagram for explaining a method of drawing a wave vector of a light beam propagated through the photonic crystal and a propagation direction of the light beam based upon a wave vector of the light beam which is incident upon a first end face as shown in FIG. 1.

FIG. 5 is a diagram for explaining a method of drawing a wave vector of a light beam propagated through the photonic crystal 10 and a propagation direction of the light beam based upon a wave vector of the light beam which is incident upon a first end face as shown in FIG. 1.

Figure 6:
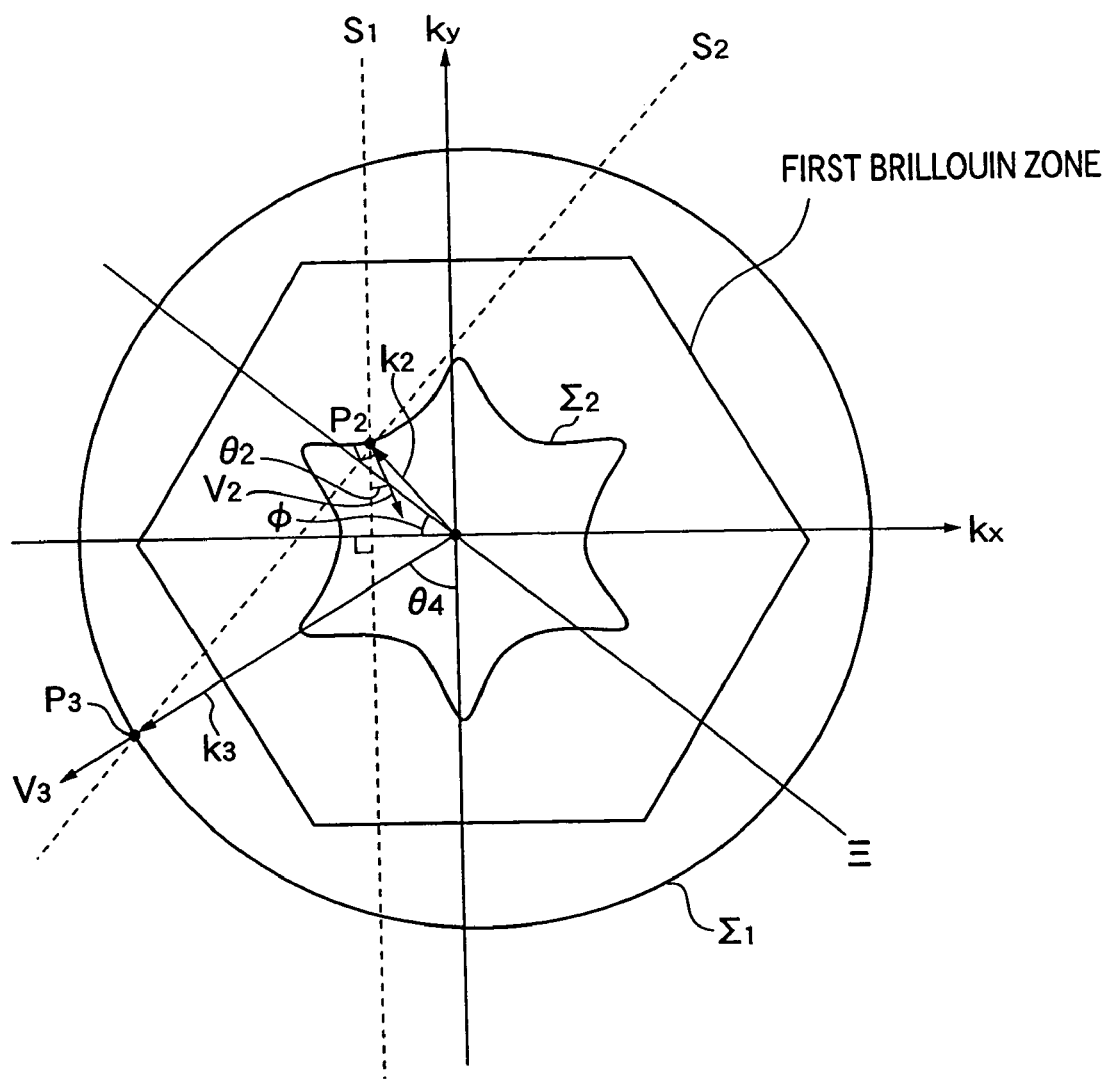
FIG. 6 is a diagram for explaining a method of drawing an angle "φ" defined between the first end face and a second end face as shown in FIG. 1.

In FIG. 5, there are represented both a constant-frequency dispersion surface $\Sigma_1$ in the air, and another constant-frequency dispersion surface $\Sigma_2$ in the photonic crystal. It should also be understood that in FIG. 5, the $k_x$-axis is made coincident with a tangential direction on the first end face 11, and the $k_y$-axis is made coincident with a normal direction on the first end face 11. The geometrical relationship may be similarly applied to the below-explained geometrical relationship as shown in FIG. 6.

In FIG. 5, such a vector $k_1$ that a point $\Gamma$ is set as a starting point and another point $P_1$ on the constant-frequency dispersion surface $\Sigma_1$ is set as an end point gives such a wave vector that the coordinates of the point $P_1$ is employed as a component thereof. Also, an outward-directed normal vector $V_1$ at the point $P_1$ on the constant-frequency dispersion surface $\Sigma_1$ gives such a direction along which a light beam having a wave vector $k_1$ is propagated in the air. Similarly, such a vector $k_2$ that a point $\Gamma$ is set as a starting point and another point $P_2$ on the constant-frequency dispersion surface $\Sigma_2$ is set as an end point gives such a wave vector that the coordinate of the point $P_2$ is employed as a component thereof. Also, a normal vector $V_2$ at the point $P_2$ on the constant-frequency dispersion surface $\Sigma_2$ gives such a direction in which light of a wave vector $k_2$ is propagated in the photonic crystal in FIG. 2. It should also be noted that the direction of the normal vector $V_2$ is employed as follows: A symbol of $\partial\omega/\partial k$ becomes positive.

On a boundary surface between two different media, tangent components of wave vectors to the boundary surface are saved. As a consequence, in FIG. 5, $k_x$ component of the wave vector is conserved.

The $k_x$ component of the wave vector $k_1$ is equal to the $k_x$-coordinate of an intersection point between the $k_x$-axis and a perpendicular line (namely, Snell line) $S_1$ which is perpendicularly drawn from the point $P_1$ to the $k_x$-axis. As a result, such a vector $k_2$ that a point $\Gamma$ is set as a starting point whereas a intersection point $P_2$ between the constant-frequency dispersion surface $\Sigma_2$ and the Snell line $S_1$ is set as an end point gives such a wave vector of light which is propagated through the photonic crystal in FIG. 2. Then, an angle $\theta_2$ defined between a normal vector $V_2$ at the point $P_2$ on the constant-frequency dispersion surface $\Sigma_2$ and the $k_y$-axis gives a refractive angle of such a light beam which is incident upon the first end face 11 at an incidence angle $\theta_1$. The light beam of the wave vector $k_2$ is propagated at the angle $\theta_2$ in the photonic crystal.

FIG. 6 is a diagram for explaining a method of drawing an angle $\phi$ defined between the first end face 11 and the second end face 12 as shown in FIG. 1.

In such a case where the light beam which is propagated through the optical element 10 is emitted from the second end face 12 at an emergence angle $\theta_4$, such a vector $k_3$ that the point $\Gamma$ is set as a starting point and the point $P_3$ on the constant-frequency dispersion surface $\Sigma_1$ is set as an end point gives a wave vector of a light bean which is emitted from the second end face 12 at an emergence angle $\theta_4$. Then, a normal vector $V_3$ at the point $P_3$ on the constant-frequency dispersion surface $\Sigma_1$ gives such a direction in which the light emitted from the second end face 12 is propagated in the air.

Also, with respect to the second end face 12, a tangential component of a wave vector is conserved. Therefor, a broken line $S_2$ passing through two points, which are the end point $P_2$ of the wave vector $k_2$ and the end point $P_3$ of the wave vector $k_3$, gives a Snell line located perpendicularly to the second end face 12. As a consequence, such a straight line $\Xi$ passing through the point $\Gamma$ and perpendicular to the Snell line $S_2$ indicates the tangential direction on the second end face 12, and also, an angle defined between the straight line $\Xi$ and the $k_x$-axis gives an angle $\phi$, which is defined between the first end face 11 and the second end face 12.

The angle $\phi$ defined between the first end face 11 and the second end face 12 can be set with a high degree of freedom as far as both the direction in which the light is propagated through the optical element 10 and the direction in which the light is emitted from the optical element 10 are located in the same side to the second end face 12. As a consequence, according to the embodiment, while the propagation direction of the light beam having a particular wavelength is largely changed in the wide range, the light can be derived in the desirable direction without increasing the element size of the optical element and the manufacturing cost thereof.

Figure 7:
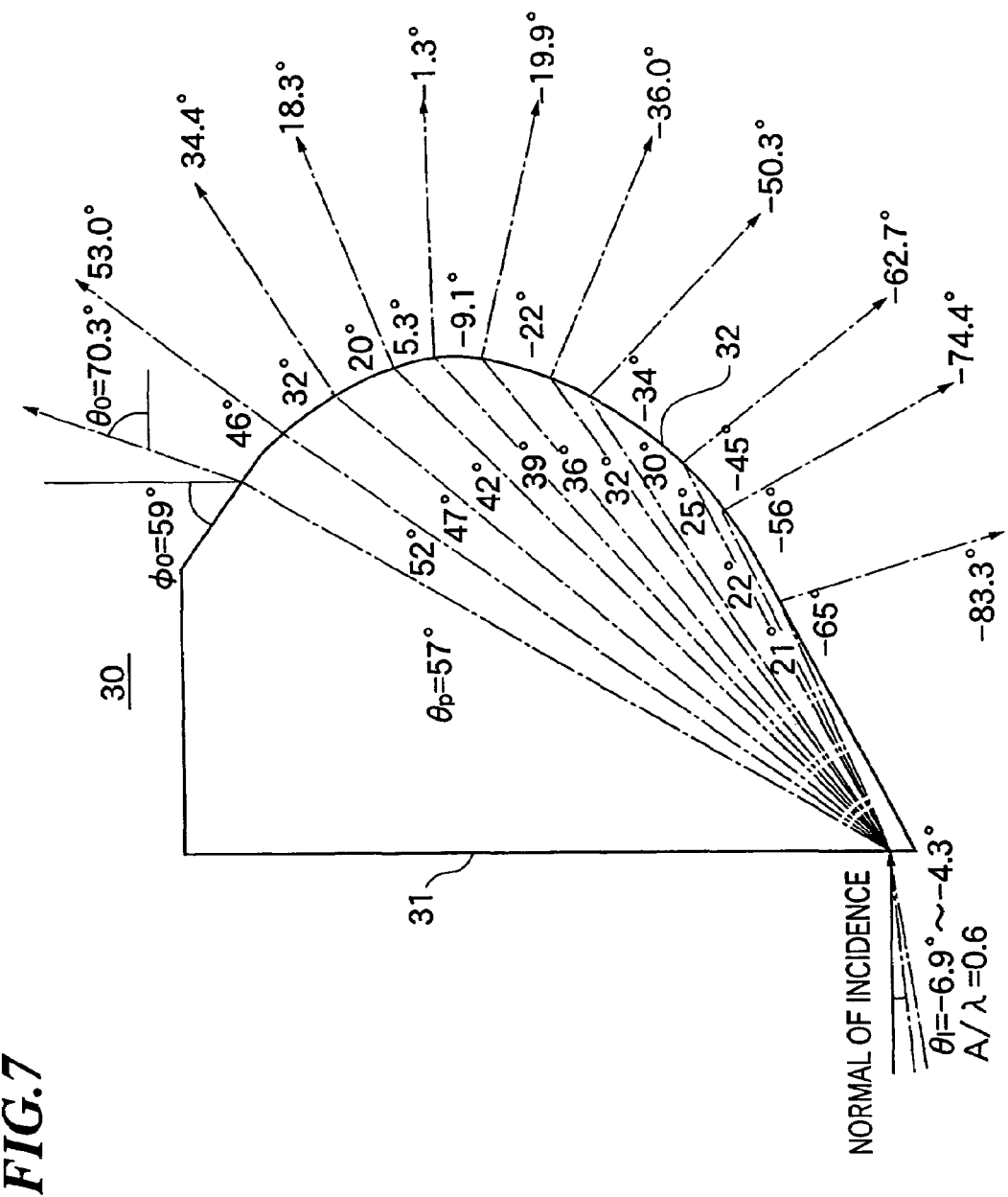
FIG. 7 is a plan view representing a shape of an optical deflection element according to a first embodiment of the present invention.

FIG. 7 is a plan view indicating a shape of an optical deflection element 30 according to a first embodiment of the present invention.

It should be understood in the first embodiment that an "emergence angle" is referred to as such an angle defined between an incident normal on the optical deflection element and a direction of a light beam which is emitted from the optical deflection element. The angle definition may be similarly applied to the below-mentioned various embodiments related to the optical deflection element.

An optical deflection element 30 corresponds to such a passive element to be used for emitting light beams having different incidence angles to different emission directions. The optical deflection element 30 is made of such photonic crystal as shown in FIG. 2.

While considering such a case where a wavelength of an objective light beam is selected to be 1.55 $\mu$m and a range of an incidence angle of the light beam is defined from $-6.9$ degrees to $-4.3$ degrees, a description will now be made of a method of determining a shape of the second end face 32 of the optical deflection element 30.

Figure 8:
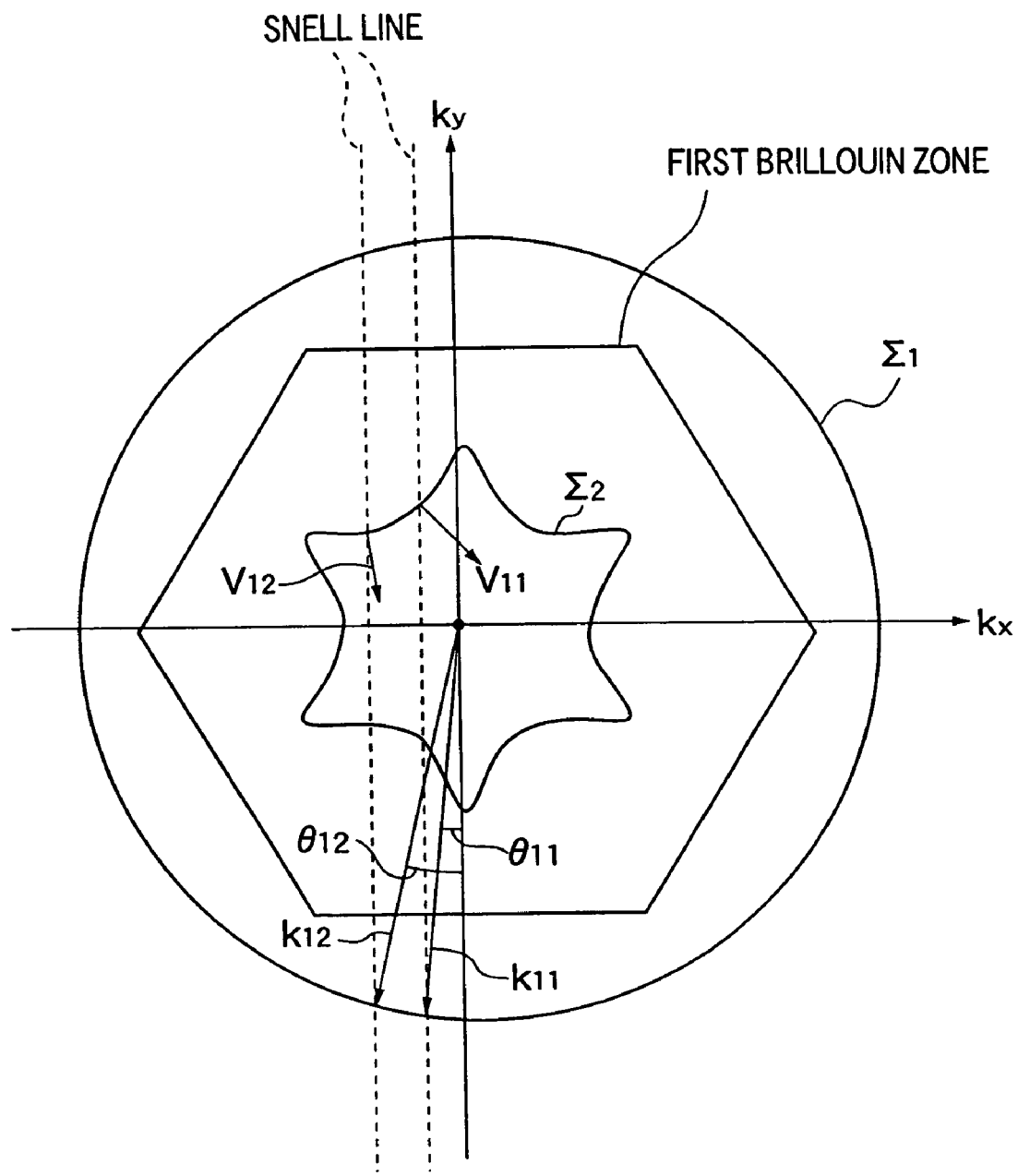
FIG. 8 is a diagram for explaining a separation characteristic of light at the first end face as shown in FIG. 7.

FIG. 8 is a diagram representing an optical separating characteristic of a light beam at a first end face 31 of the optical deflection element 30. It should also be noted in FIG. 8 that $k_x$-axis is made coincident with a tangential direction on the first end face 31, and also, $k_y$-axis is made coincident with a normal direction on the first end face 31.

In FIG. 8, a vector $k_{11}$ indicates a wave vector of a light beam which is incident upon the first end face 31 at an incidence angle $\theta_{11}$, whereas another vector $k_{12}$ indicates a wave vector of a light beam which is incident upon the first end face 31 at an incidence angle $\theta_{12}$, the incidence angle $\theta_{12}$ is larger than the above-mentioned incidence angle $\theta_{11}$. Similar to FIG. 5, such a vector $V_{11}$ is given, which is made coincident with a direction in which the light beam of the wave vector $k_{11}$ is propagated through the optical deflection element 30, whereas such a vector $V_{12}$ is given, which is made coincident with a direction in which the light of the wave vector $k_{12}$ is propagated through the optical deflection element 30.

As shown in FIG. 8, in a concave portion of a constant-frequency dispersion surface $\Sigma_2$, a normal direction at a position of incidence is largely changed owing to a slight change in the incidence angle, and thus, a propagation direction of the light beam is largely changed. As a consequence, as shown in FIG. 7, by changing the incidence angle to the first end face 31 slightly, the propagation direction of the light beam in the optical deflection element 30 is largely changed. Concretely speaking, at the first end face 31, such incident light beam having an incidence angle $\theta_I=-4.3$ degrees is refracted at a maximum refractive angle $\theta_P=57$ degrees, whereas such incident light beam having an incidence angle $\theta_I=-6.9$ degrees is refracted at a minimum refractive angle $\theta_P=21$ degrees. Those light beams are propagated through the optical deflection element 30, while being collimated, and then, reach different positions on the second end face 32.

In the first embodiment, an angle, which is defined between the tangential direction on the first end face 31 and a tangential direction on the second end face 32 at an arrival point of each propagation light beam, is determined in such a manner that the respective propagation light beams propagated through the optical deflection element 30 are emitted from the second end face 32 in different directions from each other. Concretely speaking, an angle $\phi_o$ is set to a maximum value of 59 degrees where the angle $\phi_o$ is defined between the tangential direction on the first end face 31 and a tangential direction on the second end face 32 at an arrival point of such a propagation light beam having a refractive angle $\theta_P=57$ degrees. Also, an angle $\phi_o$ is set to a minimum value of $-65$ degrees where the angle $\phi_o$ is defined between the tangential direction on the first end face 31 and a tangential direction on the second end face 32 at an arrival point of such a propagation light beam having a refractive angle $\theta_P=21$ degrees. By determining the shape of the second end face 32 in such a manner, such light beams which are incident upon the first end face 31 at an incidence angle from $-6.9$ degrees to $-4.3$ degrees are deflected at the second end face 32 in different directions at an emergence angle in such a wide range from $-83.3$ degrees to $+70.3$ degrees. As a result, according to the embodiment, the incident light beams having the different incidence angles can be deflected in the different directions over the wide range, while the optical deflection element is not made large, but also the manufacturing cost thereof is not increased.

Figure 9:
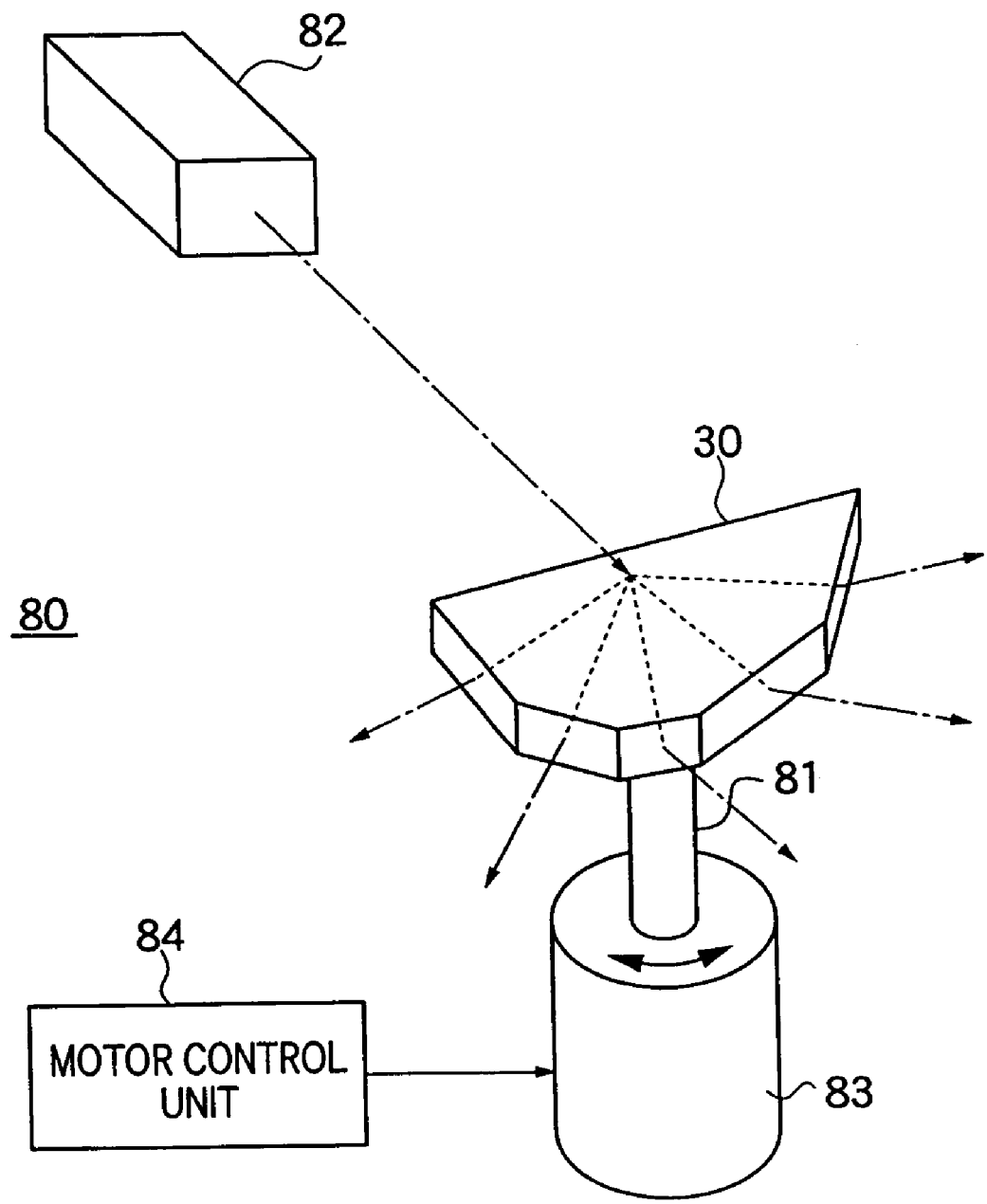
FIG. 9 is a diagram schematically representing a structure of a scanning apparatus with employment of the optical deflection element in FIG. 7.

As shown in FIG. 9, by combining the optical deflection element 30, a resonant head 81, a monochromatic laser oscillator 82, a motor 83 for driving the resonant head 81, and a motor drive unit 84 for controlling operations of the motor 83, such a scanning apparatus (for example, scanner) 80 for scanning a light beam onto an object may be constituted. In this case, the scanning apparatus 80 can carry out laser light scanning operation in a high speed and a wide range by causing a slight angle change of a light beam generated from the monochromatic laser oscillator 82 for outputting a laser light beam having a constant wavelength, while the entire scanning apparatus 80 is not made large.

Figure 10:
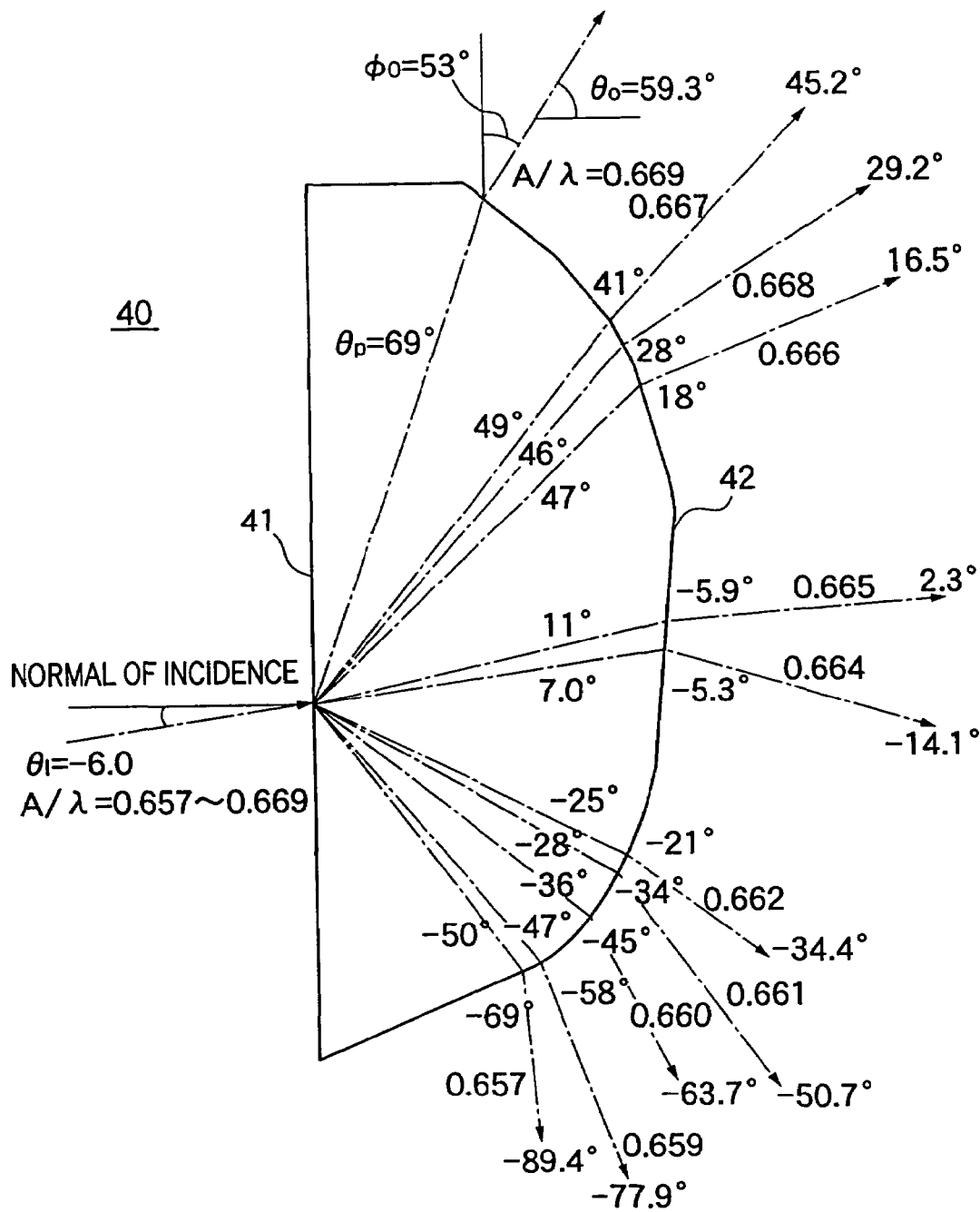
FIG. 10 is a plan view representing a shape of an optical deflection element according to a second embodiment of the present invention.

FIG. 10 is a plan view indicating a shape of an optical deflection element 40 according to a second embodiment of the present invention. An optical deflection element 40 corresponds to such a passive element capable of emitting light beams having different wavelengths in different emission directions. The optical deflection element 40 is made of such photonic crystal as indicated in FIG. 2.

While considering such a case where a wavelength range of an objective light beam is selected to be from 1.39 $\mu$m to 1.41 $\mu$m and an incidence angle of the light beam is set to be $-6.0$ degrees, a description will now be made of a method of determining a shape of a second end face 42 of the optical deflection element 40. Such a wavelength range of the light beam corresponds to a range of a normalized frequency $\Omega$ from 0.66 to 0.669.

Figure 11:
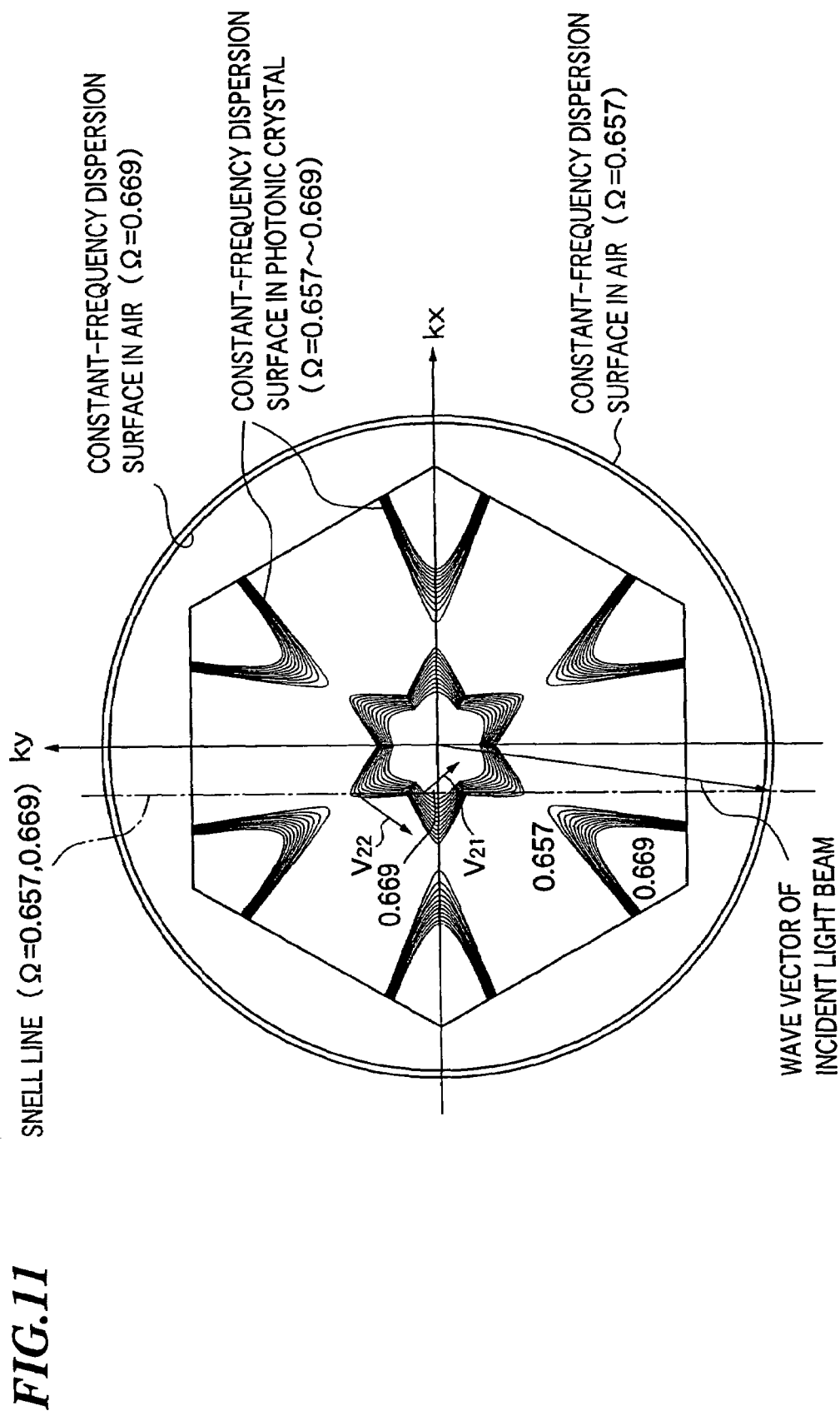
FIG. 11 is a diagram for explaining an separation characteristic of light at the first end face as shown in FIG. 9.

FIG. 11 is a diagram representing a separation characteristic of light at a first end face 41 of the optical deflection element 40. In FIG. 11, a constant-frequency dispersion surface in the photonic crystal, in which a range of the normalized frequency $\Omega$ is set to be from 0.657 to 0.669, is drawn with a frequency interval of 1.8%. It should also be noted in FIG. 11 that $k_x$-axis is made coincident with a tangential direction on the first end face 41, and also, $k_y$-axis is made coincident with a normal direction on the first end face 41.

As indicated in FIG. 11, the shape of the constant-frequency dispersion surface denoted by the optical deflection element 40 is changed corresponding to the normalized frequency $\Omega$. As a result, when a wavelength (normalized frequency) of such a light beam is changed, which light beam is incident upon the first end face 41 at a constant incidence angle, a propagation direction of the light beam in the optical deflection element 40 is largely changed. For instance, when the normalized frequency $\Omega$ is changed from 0.669 to 0.657, a vector which gives the propagation direction of the light beam in the optical deflection element 40 is changed from $V_{21}$ into $V_{22}$. As a result, as shown in FIG. 10, for instance, such a light beam having a normalized frequency $\Omega$=0.669 is refracted at a maximum refractive index $\theta_P$=69 degrees at the first end face 41, whereas such a light beam having a normalized frequency $\Omega$=0.657 is refracted at a minimum refractive index $\theta_P$=−50 degrees at the first end face 41. Those light beams are propagated through the optical deflection element 40, while being collimated, and then, reach different positions on the second end face 42.

In the second embodiment, an angle defined between the tangential direction on the first end face 41 and a tangential direction on the second end face 42 at an arrival point of each of the propagation light beams is determined in such a manner that the respective propagation light beams propagated through the optical deflection element 40 are emitted from the second end face 42 in the different directions from each other. Concretely speaking, an angle $\phi_o$ is set to a maximum value of 53 degrees where the angle $\phi_o$ is defined between the tangential direction on the first end face 41 and a tangential direction on the second end face 42 at an arrival point of such a propagation light beam having a refractive angle $\theta_P$=69 degrees. Also, an angle $\phi_o$ is set to a minimum value of −69 degrees where the angle $\phi_o$ is defined between the tangential direction on the first end face 41 and a tangential direction on the second end face 42 at an arrival point of such a propagation light beam having a refractive angle $\theta_P$=−50 degrees. By determining the shape of the second end face 42 in such a manner, a light beam, which is incident upon the first end face 41 at the normalized frequency $\Omega$ of a range from 0.657 to 0.669, is deflected from the second end face 42 in different directions at an emergence angle in such a wide range from +59.3 degrees to −89.4 degrees. As a result, according to the second embodiment, the incident light beams having different wavelengths can be deflected in different directions in the wide range, while the optical deflection element is not made large, but also the manufacturing cost thereof is not increased.

Figure 12:
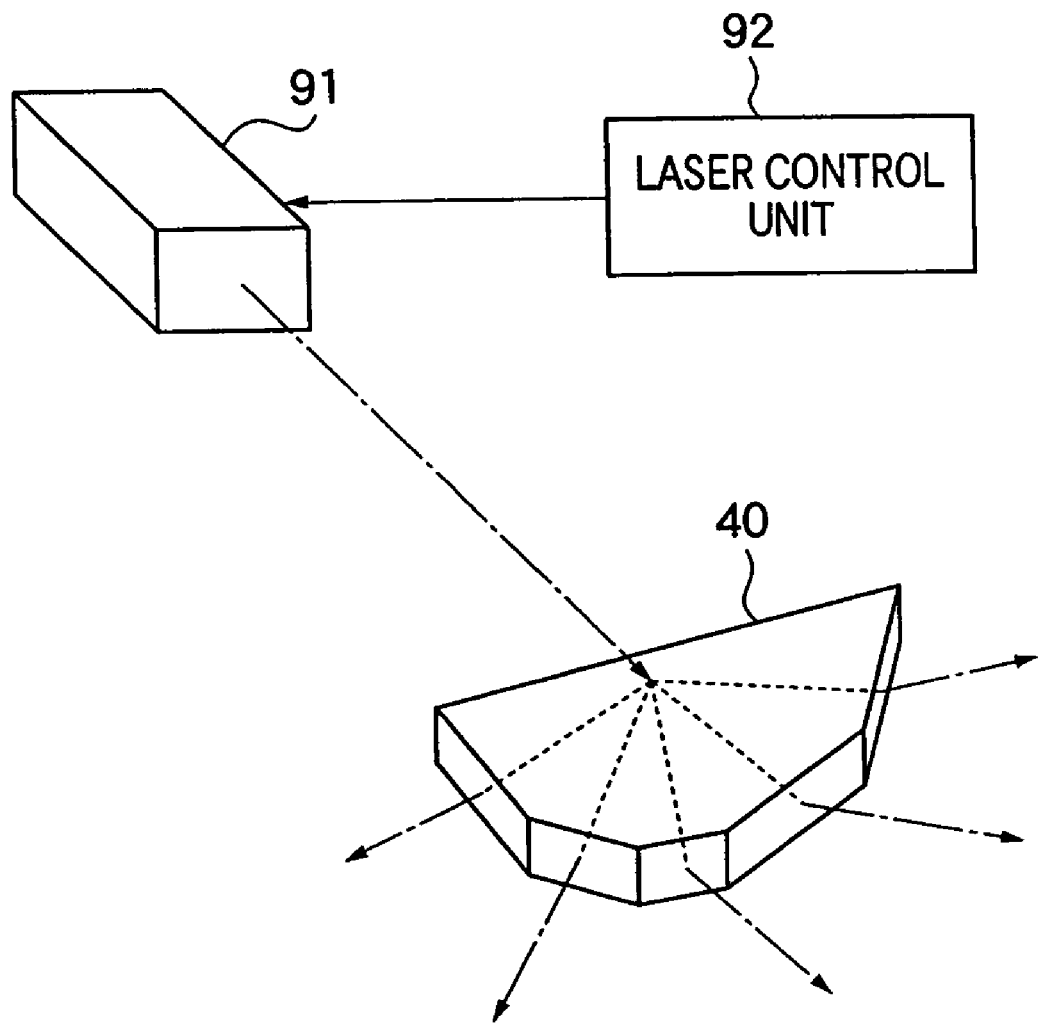
FIG. 12 is a diagram schematically representing a structure of a scanning apparatus with employment of the optical deflection element in FIG. 9.

As shown in FIG. 12, by combining the optical deflection element 40 of the second embodiment, a tunable laser oscillator 91 and a laser control unit 92 for controlling operations of the tunable laser oscillator 91, such a scanning apparatus (for example, scanner) 90 may be constituted by which a light beam is scanned onto an object. In the scanning apparatus 90, the laser light beam scanning operation can be carried out in a high speed and a wide range by causing a slight wavelength change, while the entire scanning apparatus 90 is not made large.

In the foregoing description, the optical deflection element employs only the photonic crystal as the manufacturing material. Alternatively, according to the present invention, the optical deflection element may have such a structure in which photonic crystal is interposed between two sets of normal optical media. In the alternative case, the radius of the constant-frequency dispersion surface $\Sigma_1$ as shown in FIGS. 8 and 11 may be replaced by such a value obtained by multiplying the radius by a refractive index of the normal optical media. More specifically, in the alternative case, as shown in FIG. 13 or 14, the optical deflection element 50 or 60 may be constituted by employing a material formed in such a manner that the photonic crystal is made only in a part of the normal optical medium (for example, a silicon substrate).

Figure 13:
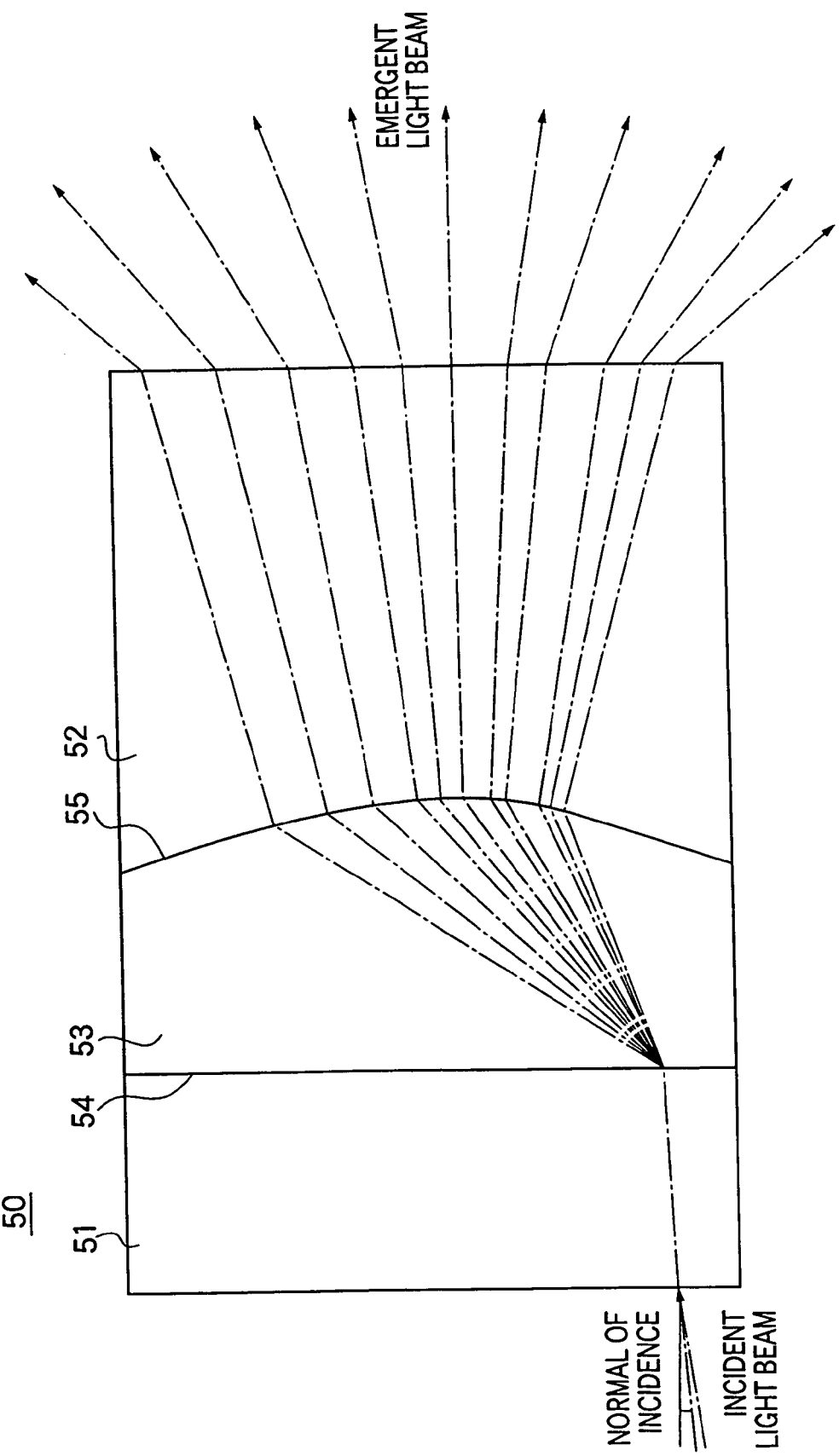
FIG. 13 is a plan view indicating a shape of an optical deflection element according to a third embodiment of the present invention.

In the optical deflection element 50 as shown in FIG. 13, a shape of a second boundary surface 55 of the optical deflection element 50 is determined based upon a drawing method similar to that of FIG. 6 in such a manner that a plurality of light beams having the same wavelength, which are incident upon a first boundary surface 54 between a normal optical medium 51 and the photonic crystal 53 at different incidence angles, are emitted in different directions from the second boundary surface 55 between another normal optical medium 52 and the photonic crystal 53.

Figure 14:
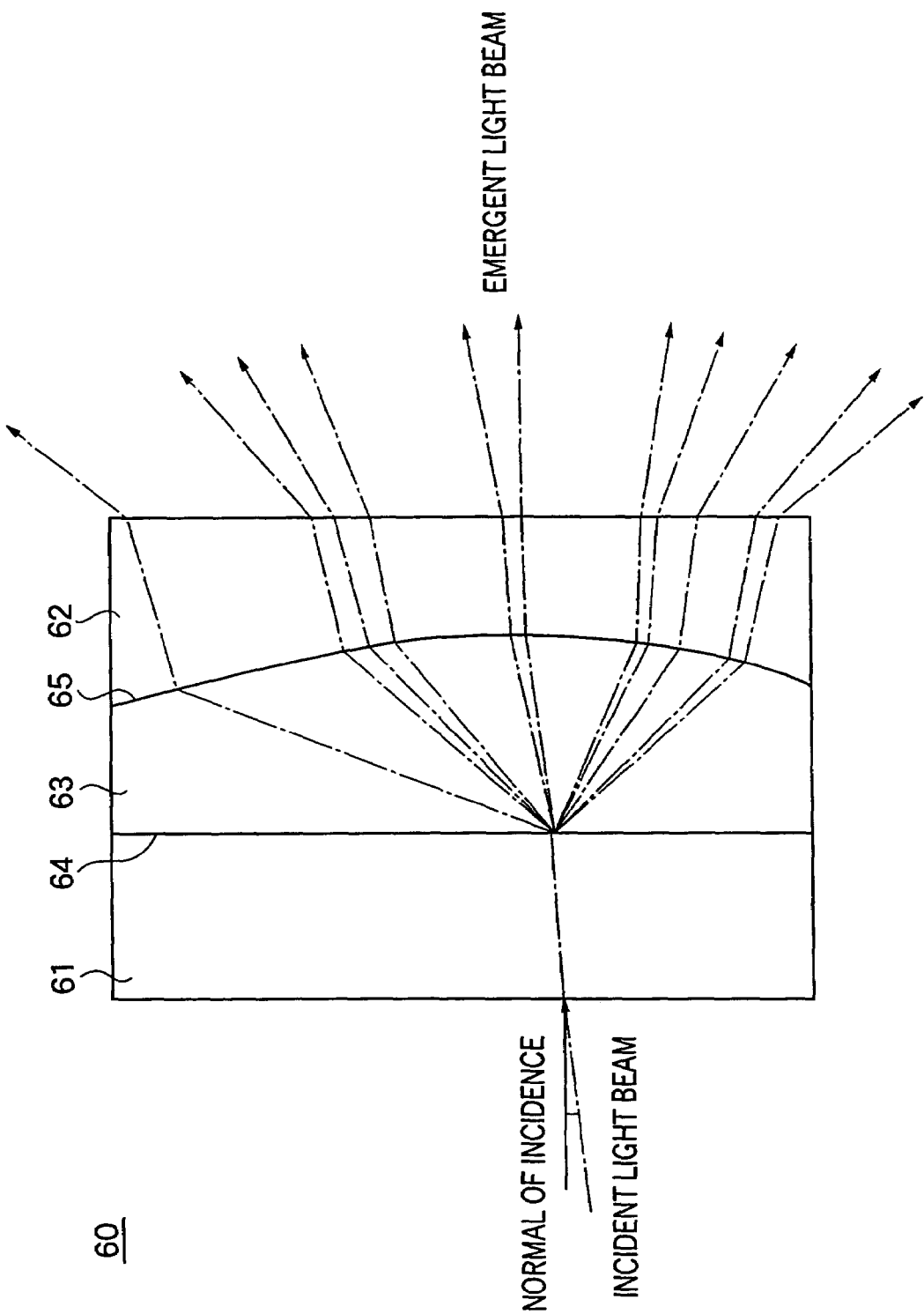
FIG. 14 is a plan view representing a shape of an optical deflection element according to a fourth embodiment of the present invention.

On the other hand, in the optical deflection element 60 as shown in FIG. 14, a shape of a second boundary surface 65 of the optical deflection element 60 is determined based upon a drawing method similar to that of FIG. 6 in such a manner that a plurality of light beams having different wavelengths, which are incident upon a first boundary surface 64 between a normal optical medium 61 and the photonic crystal 63 at the same incidence angles, are emitted in different directions from the second boundary surface 65 between another normal optical medium 62 and the photonic crystal 63.

In those cases, a portion of the normal optical medium may be merely patterned in the form of the photonic crystal structure, and also the end face treatments of the optical deflection element 30 in the first embodiment or the optical deflection element 40 in the second embodiment are no longer required. As a consequence, the manufacturing steps of those optical deflection elements can be simplified.

It should also be noted that in order to determine the shapes of the second boundary surfaces 55 and 65, the following refractive indexes may be preferably considered, namely, a refractive index between air and the normal optical medium 51 and 52, or a refractive index between air and the normal optical medium 61 and 62. In this case, a refractive angle of a light beam at a light emission end can be made small, and thus, a reflection loss occurred at a boundary surface between air and a normal optical medium may be reduced.

Figure 15:
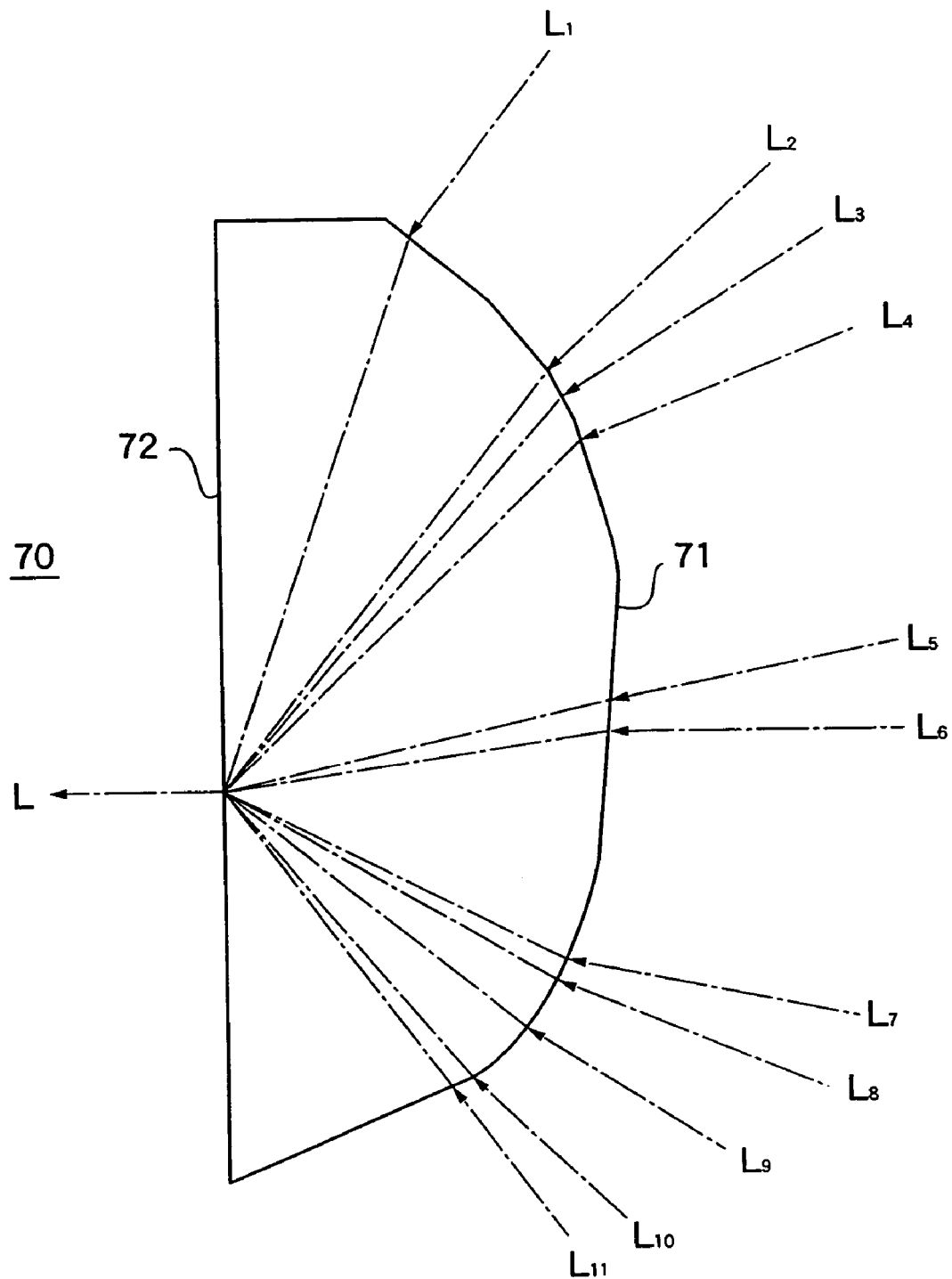
FIG. 15 is a plan view representing a shape of an optical multiplexing element according to one embodiment of the present invention.

FIG. 15 is a plan view indicating a shape of an optical multiplexing element according to one embodiment of the present invention.

In the above-explained optical deflection elements, owing to the symmetrical characteristic of the constant-frequency dispersion surfaces which characteristic is given by the photonic crystal in FIG. 2, the optical path can be traced in the reverse direction, namely from the light emission side to the light incident side. An optical multiplexing element 70 corresponds to a passive element applying such a symmetrical characteristic of the photonic crystal as shown in FIG. 2. The optical multiplexing element 70 is used to optically multiplex a plurality of light beams having different incidence angles so as to emit the multiplexed light beam in one direction.

A shape of a first end face 71 of the optical multiplexing element 70 is determined based upon a drawing method similar to that as shown in FIG. 6. That is, an angle defined between a tangential direction on the first end face 71 at each position of incidence and a tangential direction on a second end face 72 is determined in such a manner that the respective incident light beams $L_1$ to $L_{11}$, which are incident upon the first end face 71 at different positions, may be optically multiplexed with each other to produce an emergent light beam L at the second end face 72.

As a consequence, according to the embodiment, a plurality of light beams (for instance, monochromatic laser light beams) having the same wavelength and different incidence angles can be optically multiplexed with each other in a high speed in the same direction, and a light beam having a higher strength can be produced, while the optical multiplexing element itself is not made large, but also the manufacturing cost thereof is not increased.

In the embodiment, the optical multiplexing operation in which a plurality of light beams having the same wavelength and different incidence angles are multiplexed with each other is described. Alternatively, an angle defined between the tangential direction on the first end face 71 at each position of incidence and the tangential direction on the second end face 72 may be determined in such a manner that respective incident light beams having different wavelengths, which are incident upon the first end face 71 from different positions, may be optically multiplexed with each other along the same direction at the second end face 72. Also, in the alternative case, a plurality of light beams having different wavelengths can be optically multiplexed with each other in a high speed along the same direction, while the optical multiplexing element itself is not made large, but also the manufacturing cost thereof is not increased. Also, such an optical multiplexing element may be used as, for example, a wavelength mixer used in a wavelength division multiplexing communication field.

As previously described in detailed, according to the present invention, an optical element can be provided which largely changes the propagation direction of a light beam having a specific wavelength in a wide range, and derives the light beam in the desirable direction, without increasing the element size of the optical element and the manufacturing cost thereof.

Also, according to the present invention, an optical deflection element can be provided which deflects incident light beams having different incidence angles or different wavelengths at different emergence angles in a wide range, without increasing the element size of the optical deflection element and the manufacturing cost thereof.

Furthermore, according to the present invention, an optical multiplexing element can be provided which optically multiplexes a plurality of incident light beams having different incidence angles with each other along the same direction, without increasing the element size of the optical multiplexing element and the manufacturing cost thereof.

In addition, according to the present invention, a scanning apparatus can be provided which scans a light beam in a high speed and a wide range by causing a slight angle change of a incidence angle or a wavelength, without increasing the size of the apparatus and the manufacturing cost thereof.

What is claimed is:

1. An optical deflection element comprising:
   photonic crystal having a refractive index which changes periodically depending on a location within said photonic crystal; wherein:
   said optical deflecting element has a first end face and a second end face; and
   a shape of the second end face of said optical deflection element is determined in such a manner that a plurality of light beams incident upon the first end face at the same incidence angle and having different wavelengths are emitted from the second end face in different directions corresponding to the wavelengths.

2. An optical deflection element according to claim 1, wherein propagation directions of the plurality of light beams incident upon the first end face are separated from each other in correspondence with the wavelengths, whereas the separated light beams are emitted from the second end face in different directions.

3. An optical deflection element according to claim 1, wherein said photonic crystal includes optical crystal in which a plurality of circular holes are formed in a silicon substrate in a periodic arrangement.

4. An optical deflection element comprising:
   a first normal optical medium;
   a second normal optical medium; and
   photonic crystal provided between said first and second normal optical media and having a refractive index which changes depending on a location within said photonic crystal; wherein:
   said optical deflecting element has a first boundary surface between said first normal optical medium and said photonic crystal and a second boundary surface between said second normal optical medium and said photonic crystal; and
   a shape of the second boundary surface of said optical deflecting element is determined in such a manner that a plurality of light beams incident upon the first boundary surface at the same incidence angle and having different wavelengths are emitted from the second boundary surface in different directions corresponding to the wavelengths.

5. An optical deflection element according to claim 4, wherein propagation directions of the plurality of light beams incident upon the first boundary surface are separated from each other in correspondence with the wavelengths, whereas the separated light beams are emitted from the said second boundary surface in different directions.

6. An optical deflection element according to claim 4, wherein said photonic crystal includes optical crystal in which a plurality of circular holes are formed in a silicon substrate in a periodic arrangement.

7. An optical deflection element according to claim 4, wherein a material of said first and second normal optical media is the same as one of materials which constitute said photonic crystal.

8. An optical deflection element according to claim 1, wherein said second end face has plural angles with respect to said first end face so as to change propagation directions of the plurality of light beams in correspondence with the wavelengths thereof.

9. An optical deflection element according to claim 1, wherein an angle defined between a tangential direction on said first end face and a tangential direction on said second end face at an arrival point of each of plural propagation light beams is different for light beams having different wavelengths.

10. An optical deflection element according to claim 4, wherein said second boundary face has plural angles with respect to said first boundary face so as to change propagation directions of the plurality of light beams in correspondence with the wavelengths thereof.

11. An optical deflection element according to claim 4, wherein an angle defined between a tangential direction on said first boundary face and a tangential direction on said second boundary face at an arrival point of each of plural propagation light beams is different for light beams having different wavelengths.

* * * * *